Feb. 3, 1953     A. H. FRISCH ET AL     2,627,413
METHOD AND MEANS FOR PRODUCING AND RECORDING
SIMPLE AND COMPOSITE NOTES OR TONES
Filed Sept. 22, 1950
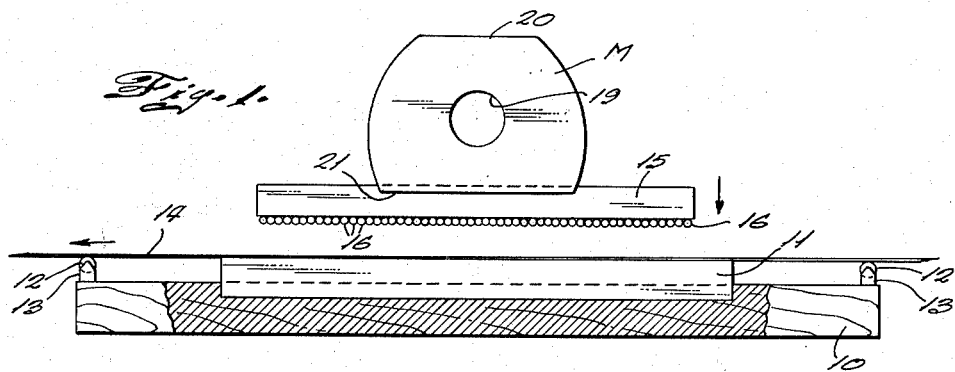
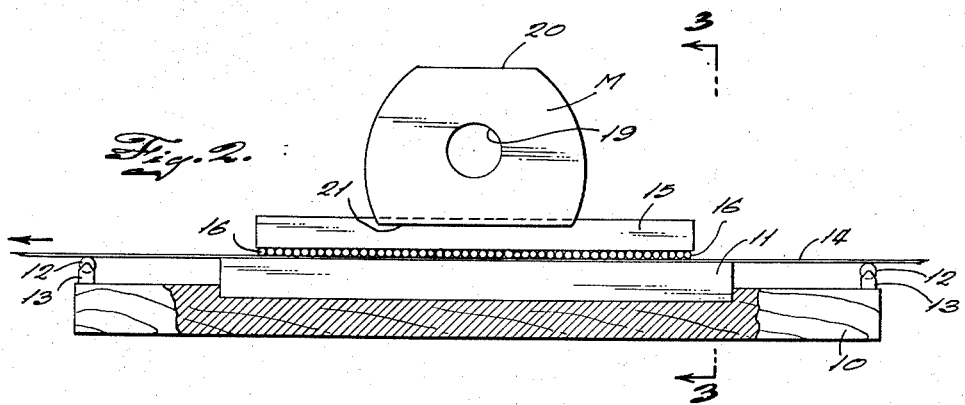
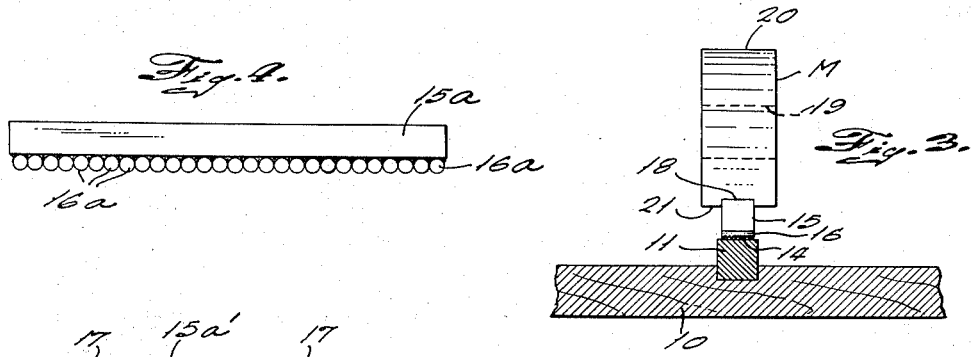
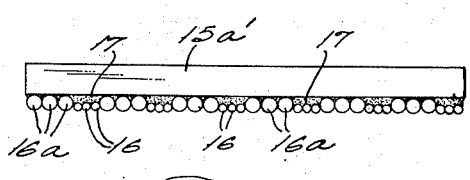
INVENTORS.
ABRAHAM H. FRISCH
ARTHUR SILVERBERG
BY
Albert Jacobs
ATTORNEY.

Patented Feb. 3, 1953

2,627,413

UNITED STATES PATENT OFFICE 2,627,413

METHOD AND MEANS FOR PRODUCING AND RECORDING SIMPLE AND COMPOSITE NOTES OR TONES

Abraham H. Frisch and Arthur Silverberg, New York, N. Y.

Application September 22, 1950, Serial No. 186,176

13 Claims. (Cl. 274—4)

1

The present invention relates to the production and recording of musical sounds, notes, tones, chords and patterns and, more especially, to a method of and means for artificially producing simple and composite notes or tones and impressing or recording the same in any desired spacing or sequence upon a magnetic tape so that the same may thereafter be reproduced on a play-back machine.

In accordance with the present invention, we have discovered how to embody or represent in a simple device any desired musical tone, note or sound, whether simple or composite, and to impress or record the same magnetically in any desired sequential pattern or order on a magnetic recording tape whereby the tones, notes, chords and patterns so recorded can be reproduced at any time by a standard or conventional play-back machine. In further accordance with our invention, we have made it possible to synthesize and record through a manual procedure involving only simple magnetic devices any note, tone, chord or pattern whatever. Such is useful in the teaching of music, harmonics, rhythm and related subjects and for the artificial creation of all types of musical sounds and patterns which can then be reproduced by passing the magnetic tapes with the recordings thereon through standard play-back machines. In this way, for example, we may achieve, synthetically or artificially, tones and notes similar to various musical instruments, such as the clarinet, oboe and cello, and simpler types of tones or notes, such as those involved by drums.

Our invention is predicated upon the discovery that a relatively simple and inexpensive die can be made for each desired note or tone and that the note or tone represented by each such die can be magnetically recorded on a tape. We have, in this connection, produced a considerable number of dies each of which corresponds to a particular note on the piano. The note or tone involved by a particular die is a function of the diameter of each of a row of longitudinally arranged solid metallic rods or cylinders secured to and constituting the outer or active surface of each die, although we have also found that suitable and satisfactory results can, alternatively, be obtained by cutting, etching or otherwise configuring the outer surface of a die bar to produce an analogous shape. Each such die may be such that it represents a single note or tone the duration of which is controlled by the length of the die and the speed at which the tape is run for play-back purposes. Since the standard speed for running such magnetic tape is 15 feet per second, such is understood as incorporated herein by reference but other speeds may be utilized with proportionate effects upon duration and pitch.

Our invention also comprehends a simple

2 method or procedure which can be carried out substantially manually and which is characterized by the fact that it needs no elaborate mechanism or a source of electrical current. The invention is carried out through the utilization of the forces of magnetism.

In the accompanying drawing wherein we have illustrated certain typical embodiments of the invention:

Fig. 1 is a sectional view, partly in elevation, of a device responding to the invention and in a condition shortly prior to the recording of a note or tone on a magnetic tape;

Fig. 2 is a view similar to Fig. 1 wherein the parts have been brought into a condition in which contact is made for recording the tone or note;

Fig. 3 is a transverse sectional view, partly in elevation, taken along line 3—3 of Fig. 2;

Fig. 4 is a detail view of a die having on its outer or active surface a plurality of cylindrical rods which constitute a definite musical note different from (lower than) that of Figs. 1 and 2, as will be noted from the difference in diameter of the cylindrical rods, the scale being approximately actual size, and Fig. 5 is a view similar to Fig. 4 but illustrating the principle of artificially producing a composite tone for recording purposes, in this particular case combining the notes of the dies of Figs. 1–3 and 4.

Referring now to the drawing in detail, the numeral 10 represents a non-magnetic insulating base which is shown as being composed of wood but which may be of any other natural or artificial insulating material. The size, shape and thickness of the base 10 are not critical except that the same should be large enough to provide the necessary insulation and to constitute a suitable support for the member 11, which is a cold-rolled iron bar partially countersunk in the upper surface of the insulating base 10. Member 11 may be substantially flush with the upper surface of the insulating base 10 or may project somewhat above such surface, as shown, it having been found preferable to pass the magnetic tape over the bar 11 spaced at least slightly above base 10.

As will be appreciated hereinafter, the cold-rolled iron bar 11 makes it possible to complete the magnetic circuit involved at the moment of recording. Consequently, member 11 may be of any suitable or desired metal or alloy having high magnetic permeability with low hysteresis. Low hysteresis makes it possible to re-utilize the system over and over in rapid succession. The base 10 may also be provided with supporting or idle rolls 12 journaled in suitable upstanding brackets 13 mounted on the base, so as to maintain the magnetic tape 14 in a suitable position for handling, movement, recording thereon and with minimum contact with the system, and magnetic tape 14 may be of any suitable or known character such as that now marketed under the name of "Scotch Magnetic Recording Tape." It may either be a long strip wound as a roll or an endless band but, since our invention preferably contemplates reproduction from a recorded tape in the form of an endless band, the tape, when in strip form, may be converted to an endless band form by sealing the ends together by any of the available adhesives known for such purpose. Movement of the band for recording purposes may be manual or mechanical, in the latter event under the control of a Geneva movement or the like to provide step-by-step or intermittent travel.

The particular note or tone involved is represented by a die made up essentially of the metallic die base 15, the outer or active surface of which is provided with a series of transversely disposed short parallel rods 16 of equal or substantially equal length and of equal diameter, made of a magnetizable material and secured in position by means of a suitable adhesive, such as an iron oxide cement or other adhesive which does not interfere with the magnetic system. The diameter selected for each of the rods 16 determines the note or tone which the die represents; the length of the die base 15 and, therefore, the number of the rods 16 determines the duration of the note or tone, the longer the base 15 and the greater the number of rods 16, the longer the duration of the note or tone for a given speed of reproduction. The particular note represented by the die of Figs. 1, 2 and 3 is the F-sharp constituting the 46th note of a standard 88-note piano, counting from the lowest note as note #1.

The rods 16 affixed to the die base 15 are positioned thereon and adhesively or otherwise secured thereto in any suitable manner. I have found, for example, that it is particularly efficacious to arrange the series of rods 16 on the sticky or tacky side of a piece of ordinary Scotch tape which holds them in assembled parallel relationship and then the piece of Scotch tape with the rods thereon is reversed against the die bar which has been prepared for the reception of the same by thoroughly cleaning it and then applying an adhesive which does not interfere with the magnetic system—or the adhesive can equally well be added to the rods on the Scotch tape and then, by pressing the opposite side of the Scotch tape against the die base surface, the rods are caused to become transferred to the die base and the same is allowed to set or become fixed prior to use.

It is important in this connection that the high points of the adjacent rods 16 be accurately leveled since it is these high points which make contact with the magnetic recording tape 14 for impressing the note or tone thereupon, the tape and its supporting bar being tangent to the high points of such rods at the time of contact for recording purposes. It is desirable also, but not essential, that the rods be of equal length but slight irregularities in length have been found to have no noticeable or adverse effect upon the clarity or accuracy of the note or its recording. As already indicated, the duration of the note or tone is a function of the number of rods 16 and, therefore, the number may be varied from a very small number, such as 3, to any desired number; for practical purposes, a die constructed and arranged as shown in the drawing, which is actual size, has been found to be optimal.

It is to be understood, however, that the number of rods 16 may be varied to produce notes or tones of different durations and especially when it is desired to fit in the durations of such notes or tones with other notes or tones and especially when, as will be hereinafter set forth, simple or composite notes or tones are superimposed one upon the other by successive die contacts upon the same areas of the magnetic recording tape. For example, and as shown in Fig. 4, the diameter of the rods 16 may be altered and thus the rods 16a upon the die base 15a of Fig. 4 represent a lower note or tone than the die of Figs. 1-3 and, similarly, instead of employing a simple or unitary note or tone, as is the case with the dies of Figs. 1-4, inclusive, a composite note or tone may be fabricated, as is shown in Fig. 5, wherein the rods 15a and 16a are shown as alternating in their arrangement upon the die base 15a'. In this connection we have further discovered that the best composite sounds or tones are secured when the number of rods of different diameter are in groups of 3's and, therefore, 3 rods may be considered as a basic unit providing two high points for recording upon a magnetic tape 14 to give a definite reproducible note or tone. In order to maintain the high points of all the rods level and in a single flat plane, suitable adhesive or matrix material, indicated at 17, is employed in which the smaller of the rods are held or somewhat embedded. This material may, for example, be an iron oxide cement or other adhesive or bonding material which does not interfere with the magnetic system and which will serve to hold the rods fixedly in place on the die base.

It is to be understood that we suitably prepare a set of or a considerable number of dies representing both simple and composite notes or tones. These notes or tones may correspond to any or all of the 88 frequencies of piano keys or the notes resulting from the playing of any musical instrument, but it will be clear that we are not so limited because, by means of the dies and the selection of the diameter of the rods, we can create intermediate notes or tones as well as notes or tones which have no known or existing counterpart. We can, moreover, create what may be termed "fractional" notes or tones which are part way between two adjacent piano notes or other known notes and, therefore, at least theoretically, we are able to create an almost infinite variety and character of tones or notes which, when recorded and played back, produce new, unusual and highly useful tonal, musical or emotional responses and effects. This is true both of the simple or unitary notes or tones—notes or tones which have a single predominating audible characteristic—as well as to composite sounds. By superimposing the recording of one note or tone upon the same portion or area of the recording tape, it is further possible to produce special composite or unique tones, sounds or effects. For example, when two different dies are caused to record their notes or tones on the same area of a magnetic recording tape, a two-part counterpoint is produced; by superimposing three different dies upon the same area of the magnetic recording tape, harmony may be created, and so on.

In recording the notes or tones, whether simple or composite and whether from a single impression of one die or multiple impressions of a plurality of dies, we prefer to use a permanent magnet, indicated by the letter M in the drawing, which may be of any suitable size or shape for convenient handling but which has sufficient magnetic strength to hold a die base 15, 15a or 15a' in fixed but detachable association therewith during the time a particular die is being utilized; but it is understood, of course, that, instead of using a single magnet and changing the magnet from one die base to another, a plurality of such magnets may be employed where speed of recording or time relationship is complex or required to be extremely accurate. The magnet M may be, for example, a so-called 6 lb. permanent magnet, which means that it has a magnetic attraction or pull equivalent to a 6 lb. weight. The magnet is preferably but not necessarily provided with an undercut groove or recess 18 within which any of the die bases 15, 15a or 15a' is adapted to fit snugly, as will be clear from Fig. 3, and such magnet may or may not have a central opening 19 for ease of manipulation. In the particular arrangement illustrated in Figs. 1–3, the generally toroidal magnet has a flattened upper surface 20 which constitutes its north pole and a flattened grooved under-surface 21 which constitutes its south pole, the south pole being somewhat more extensive than the north pole in its area. The invention works equally well, however, when the magnetic poles are reversed. The groove enables the die base to be correctly and accurately positioned with respect to the magnet.

In carrying out our procedure for recording sounds on a magnetic recording tape, the magnet-die assembly is made and then the same is brought down upon a portion of the magnetic recording tape 14, whereupon the high points of the rods make contact with the recording tape and magnetically impress and record thereon the tone or note represented by the particular die. The magnetic recording tape has previously been arranged so that it is adapted to be passed over the bar 11 in a longitudinal (left to right) direction (in Fig. 1). The movements of the magnet and die may be entirely manual and under the complete control and will of the user or operator and it will be understood that the same is brought down upon and lowered into contact with the magnetic recording tape 14, which is at the moment of recording in a stationary condition. This is represented by the movement of the magnet and die from the intermediate position of Fig. 1 to the ultimate position of Fig. 2, which shows the relationship and relative positioning of the parts at the time of contact and recording. The magnet M sets up a magnetic circuit or system which passes from the magnet down through the die base and the rods on the underside thereof through the magnetic recording tape 14 and through the bar 11. Only momentary contact is required and a short-time accurate positioning of the rods 16 upon the tape 14, followed by immediate raising of the magnet and die produces a clean, sharp note or tone. Intentionally blurred or somewhat indistinct notes or tones could, however, be produced if so desired in a manner clear from the foregoing.

It will, therefore, be appreciated that the arrangement should be such that all the rods of one die will make simultaneous contact with the magnetic tape. After the magnet and die have been raised out of contact with the tape 14, the latter is then moved a sufficient distance to clear the recorded portion for the reception of another note or tone unless it is desired to superimpose two or more notes or tones upon the same tape area; in the latter case the tape remains stationary and the other dies are successively brought down upon the same tape area overlying the bar 11 but, in the event that, as is frequently the case, only a single note or tone is to be impressed upon a given area of the tape, then the tape is moved and the distance which it is moved depends upon the sequence and pattern being recorded, having due regard to the speed at which the tape is passed through a play-back machine.

It will, furthermore, be observed that a series of impressions or recordings are magnetically produced in or upon the tape 14 by bringing down thereupon a succession of single or composite dies, the tape being longitudinally moved or not depending upon the results which are desired. In this manner a length of magnetic tape can be recorded, i. e., can be made to contain a plurality of notes, tones, patterns, etc., which are reproducible by passing the tape through a playback machine. It will further be appreciated that the variety of notes, chords, patterns and rhythms which can be produced is unlimited both as to the elements (individual notes or tones) thereof and as to the ultimate audible effect when played back. While it forms no part of or limitation upon our present invention, the magnetic recordings so made can be rendered visible, if desired, by developing and fixing the impressions made upon the magnetic tape in the manner herein described. This has value in connection with checking the accuracy of the recording and in inspecting and analyzing the tones, chords, patterns and rhythms, but is ordinarily unnecessary. The solutions employed for developing and fixing magnetic impressions are known and require no description here but are based upon the use of iron carbonyls in a solvent.

The foregoing is intended as illustrative or exemplary and not as restrictive or limitative since other variations and modifications may be made without departing from the spirit or principle of the invention as defined by the subjoined claims. In particular, we may produce the dies by cutting or etching one surface thereof to produce the configuration of a series of rods or half rods, so that the die is a unitary piece of material instead of an integral association of rods and a die base but we have found that the application of rods of pre-selected diameters to a die surface in the manner described above is the best mode which we presently know for realizing the invention. Similarly, the operations of making the sequential impressions of dies upon the magnetic tape may be semi-mechanical in that the magnet and die may be mounted on an arm which is pivotally connected to some adjacent supporting member so that the die will travel accurately into the desired position over bar 11. Furthermore, and where exact positioning of the impressions upon the magnetic tape is desired or required, the tape may be moved by a Geneva movement or other known mechanical arrangement for producing step-by-step or intermittent motion. These features of the invention will be more fully appreciated from a consideration of our co-pending application, Serial No. 179,454, filed August 15, 1950.

We claim:

1. In means for producing and recording musical sounds, a die representing a musical sound and essentially composed of a magnetizable die base to one surface of which is secured a plurality of transversely disposed, parallel short metallic rods of magnetizable composition which are in contact with one another and which present a series of high points disposed in a single plane.

2. In means for producing and recording musical sounds, a die representing a musical sound and essentially composed of a magnetizable die base to one surface of which is secured a plurality of transversely disposed, parallel short rods of magnetizable composition which are in contact with one another and which have such a cross section as to present a series of high points disposed in a single plane, said rods being all of equal cross section.

3. In means for producing and recording musical sounds, a die representing a musical sound and essentially composed of a magnetizable die base to one surface of which is secured a plurality of transversely disposed, parallel short metallic rods of magnetizable composition which are in contact with one another and which have such cross sections as to present a series of high points disposed in a single plane, said rods being of at least two different cross sections alternately arranged in groups of equal number.

4. In means for producing and recording musical sounds, a die representing a musical sound and essentially composed of a magnetizable die base to one surface of which is secured a plurality of transversely disposed, parallel short metallic rods of magnetizable composition which are in contact with one another and which are of circular cross section so as to present a series of high points disposed in a single plane, said rods being of at least two different diameters alternately arranged in groups of equal number, matrices on said base for supporting the smaller of such rods so that the high points of all such rods retain a smooth even plane.

5. In a method of producing and recording musical sounds magnetically upon a magnetic recording tape, the steps which comprise preparing a plurality of dies constructed as claimed in claim 1, representing predetermined musical sounds and selectively contacting said magnetic tape with such dies while said dies are temporarily in contact with a permanent magnet as the sole source of energy in a predetermined sequence to produce desired notes, chords and patterns, some of said dies being contacted with the same areas of said magnetic tape and some of said dies being contacted with succeeding areas of said magnetic tape.

6. A recording device for a musical sound comprising a magnet, a die representing a selected musical sound having a plurality of rods of magnetizable material removably associable with a pole of said magnet and arranged parallel to each other with the outermost surface of each rod lying in a single plane, the cross sections of said rods being such that there are spaces between said outermost surfaces of adjacent rods, means for supporting a magnetizable record blank below and in a position to receive magnetic impressions from said die and a magnetizable record blank movable over said support beneath said die, whereby said die may be brought into contact with said record blank for recording on said record blank the musical sound represented by said rods.

7. A recording device as defined in claim 6, in which said die has an elongated die base of magnetizable material to the under side of which said rods are transversely affixed in abutting positions and the record blank supporting means is adapted to support the magnetizable tape in a tangential position with respect to said rods, said rods being circular in cross-section and of the same diameter for a predetermined sound, the musical sound represented by said die being a function of the diameter of said rods and the duration of said sound being proportional to the number of said rods.

8. A recording device as defined in claim 7, in which the means for supporting the magnetizable record tape includes a bar of magnetizable material having a low hysteresis characteristic and means for guiding said tape lengthwise over said bar, said die being adapted to be moved perpendicularly toward and away from said bar with said tape therebetween.

9. A recording device as defined in claim 8, in which the magnet is a permanent magnet constituting the sole source of energy for recording purposes with which the die base is magnetically associable and removable.

10. In means for producing and recording musical sounds, the combination, as defined in claim 2, in which the rods have a circular cross section.

11. In means for producing and recording musical sounds, the combination, as defined in claim 3, in which the rods have a circular cross section.

12. In a method of producing and recording musical sounds magnetically upon a magnetic recording tape, the steps which comprise preparing a plurality of dies, constructed as claimed in claim 1, representing predetermined musical sounds and selectively contacting said magnetic tape with such dies in a predetermined sequence to produce desired notes, chords and patterns, some of said dies being contacted with the same areas of said magnetic tape and some of said dies being contacted with succeeding areas of said magnetic tape, said dies being brought into contact with said tape in a magnetic field generated by temporarily associating said dies at the time of contact with a permanent magnet constituting the sole source of energy.

13. In a method of producing and recording musical sounds magnetically upon a magnetic recording tape, the steps which comprise preparing a plurality of dies, constructed as claimed in claim 1, representing predetermined musical sounds and selectively contacting said magnetic tape with such dies in a predetermined sequence to produce desired notes, chords and patterns, some of said dies being contacted with the same areas of said magnetic tape and some of said dies being contacted with succeeding areas of said magnetic tape, said dies being brought into contact with said tape in a magnetic field generated by temporarily associating said dies with a permanent magnet at the time of contact and thus subjecting said dies and tape to the momentary influence of said magnetic field in a one-sided magnetic circuit employing magnetism as the sole source of energy.

ABRAHAM H. FRISCH.
ARTHUR SILVERBERG.

REFERENCES CITED

The following references are of record in the file of this patent:

UNITED STATES PATENTS

| Number | Name | Date |
| --- | --- | --- |
| 2,511,121 | Murphy | June 13, 1950 |